United States Patent

[11] 3,587,049

[72] Inventor James P. Nicklas
Woodlands Hills, Calif.
[21] Appl. No. 737,626
[22] Filed June 17, 1968
[45] Patented June 22, 1971
[73] Assignee Electronic Arrays, Inc.
Woodland Hills, Calif.

[54] CREDIT CARD TESTING EQUIPMENT
8 Claims, 3 Drawing Figs.

[52] U.S. Cl. .................................................. 340/149
[51] Int. Cl. .................................................. H04q 9/00
[50] Field of Search .......................................... 340/149;
179/2 CA; 235/61.7 B

[56] References Cited
UNITED STATES PATENTS
3,308,238 3/1967 Brothman et al. .......... 340/152 X
3,465,289 9/1969 Klein ........................... 235/61.7 X Primary Examiner—Donald J. Yusko
Attorney—Smyth, Roston & Pavitt ABSTRACT: The testing equipment disclosed provides for bidirectional reading of a code word stored on a credit card in machine readable form to check the result of the first reading against the second reading. The code read is stored in a memory and is compared with all code words on a film, on a character for character and code word for code word basis. Detection of the code word on the card as one of those on the film is indicated.

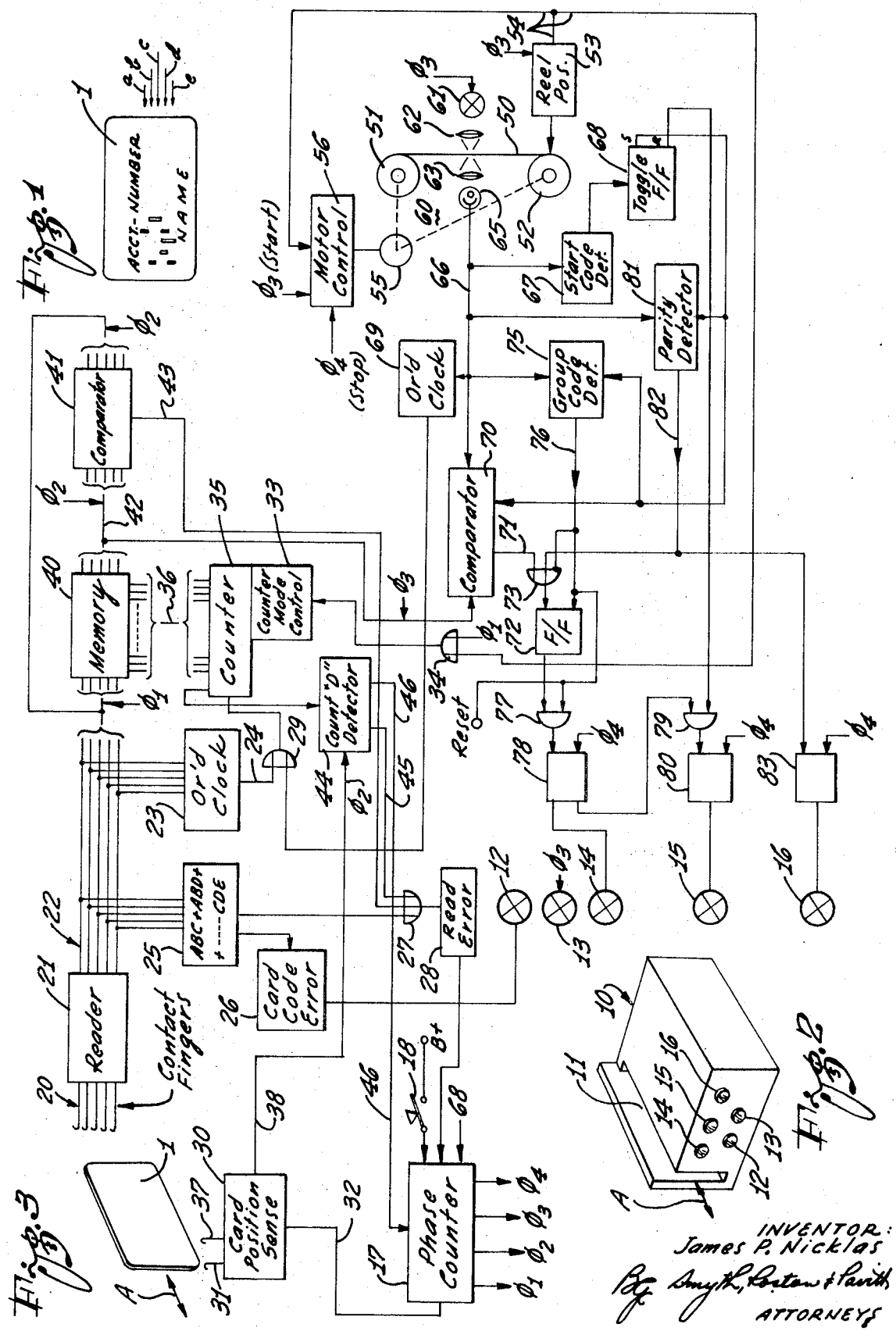

CREDIT CARD TESTING EQUIPMENT

The present invention relates to a credit card testing apparatus. Credit cards are more and more widely used, and accordingly the probability of misuse and actual misuse has increased at a staggering rate. Misuse involves, essentially, unauthorized use of lost or stolen cards and/or use in excess of a fixed or reasonable credit limit. The present invention thus relates to an apparatus reducing the possibilities of misuses.

A card, when presented, for example, to a dealer, is to be tested in a simple, but reliable, manner in order to determine whether or not the card is a "wanted," lost or stolen, canceled, stopped, or the like, card. It is important that the testing equipment does not find a card to be on the "wanted" list when, in fact, it is not, as the resulting embarrassment will readily destroy customer goodwill. Moreover, the list must be readily updatable, to shorten the period of possible unauthorized use.

The apparatus, in accordance with the preferred embodiment of the invention, is a self-contained unit which includes a card reader as input device. Credit cards usually bear individual identifying multidigit numbers, or, more generally, a plurality of so-called alpha numerical characters are on a card in machine-readable form. In the following, the machine readable number or assembly of alpha numerical characters on a card will be called the identifying code word. The identifying code word usually defines the account number under which charges for purchases of the customer are accumulated.

The card is placed into the apparatus and read in two directions, once when inserted and again when removed. When read during insertion, the reader develops signals representing the several characters of the code word and in a sequence commensurate with direction of reading. The signals are stored in a memory having individually addressable storage locations, and addressing is controlled from a counter which is under control of the reader to derive therefrom clock pulses for address counting. The code word on the card is read in the reverse during card withdrawal and now the resulting signal train is compared with the signals stored in memory. For this purpose the stored signals are withdrawn from memory and the addressing sequence runs in the opposite direction.

If a read error has occurred, there will be lack of complete comparison and an indication thereof is provided accordingly. A damaged or abused card is thus rejected in this manner without, however, becoming identified as a "wanted" card. The dealer has now the option to reject the card and to suggest issuance of a substitute, or he may risk acceptance of a card which may be on the "wanted" list, because a code on a card producing a read error cannot be compared with the "wanted" codes.

The apparatus now contains an easily exchangeable record, such as a roll of film on which are recorded the identifying code words of "wanted" cards. The code words are preferably recorded on the film in a serial by character format; each identifying code word as defined by several characters on the film is separated from the next one thereon by a special character.

The code word held in memory is now compared with the code word read from the film. The rate of character reading from the film determines the sequencing of memory addressing to provide a character for character comparison. The direction of film motion determines and controls the direction of memory addressing, and the detection of the special character determines and controls the repetition of a memory addressing cycle as well as the instant of sampling whether a complete code word just read from the film compares with the code word held in memory as to each character.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 1 illustrates a plan view of a typical credit card;

FIG. 2 is a perspective view of the casing holding testing equipment in accordance with the present invention; and FIG. 3 is a block circuit diagram for the testing equipment in the casing, shown in FIG. 2, in accordance with the preferred embodiment of the present invention.

Proceeding now to the detailed description of the drawings, in FIG. 1 thereof, there is illustrated an example for a typical type of credit card one as it is in widespread use. The credit card is usually made of a piece of hard, but not completely inflexible, plastic and includes, among others, the following areas for information. There is an area for the name of the person who is the authorized user and/or the person who is responsible for the extended credit. The name is usually embossed in that raised bosses outlining the contour of the several letters of the name can be used as stencils to provide an imprint on a record slip wherein the seller or dealer enters relevant information concerning a purchase on credit. Often there is an area for the signature(s) of the authorized user(s).

In another row on the card, so to speak, there are embossed letters defining the account number and having been provided also as stencils for imprint. It has become more and more the practice to include an identifying code in a third field or row. That code is, for example, the same account number but in more readily machine legible form. This is not essential for practicing the invention as pattern recognition devices are available so that alpha numerical characters are directly readable by people as well as reading devices. However, a simpler code as to machine reading is preferred, as it reduces expenditure in and for the equipment.

Each alpha numerical character to be encoded, for example, has 5 bits arranged in, for example, five tracks, $a$, $b$, $c$, $d$, and $e$. A code often used for credit cards is, for example, the so-called "two out of five" code. There are two (no more, no less) raised bosses per character. They may, for example, represent "ones" so that the remaining 3 bits (no bosses) on the line defined by the two bosses of a character, represent the "zeros" thereof. The several characters to be encoded in this manner are distinguished by the position of the two "ones" and of the three "zeros" within the 5-bit character format. Other codes, of course, could be used, but in general, it is advisable to use a self-checking code in which all bits are never "ones" or "zeros," and with even (or odd) parity.

As a customer presents a credit card to a seller, for example, a dealer in a filling station, the dealer will place the card into a credit card checking unit 10, as shown in FIG. 2. In particular, the dealer will insert and slide the card into the slot 11 in the direction, as indicated by arrow 12. After having the card fully inserted, the dealer will take the card out again, by sliding it out of slot 11 in direction opposite to arrow A. As a consequence of this manipulation, immediately or shortly thereafter, one or two of five indicator lamps 12, 13, 14, 15 and 16 will light up.

Lamp 12 indicates a card code error. Lamp 13 indicates absence of a card reading error. Lamp 14 may be a red light and will signal "stolen" or "wanted" cards. Lamp 15 may be a green lamp, and when lighting up it indicates that the credit card is not among the wanted ones listed in a record within unit 10. An additional lamp 16 may be provided to indicate the existence of a parity error in the record read during the interrogating and scan process within unit 10. Details of the equipment are illustrated in FIG. 3.

The system contained in unit 10 is, in general, under control of a phase counter or state counter 17, causing the system to operate in any instant in one of, for example, four phases. Phase 1 is the read-in operation when the card in inserted in slot 11 and moved therein in direction of arrow 12. Phase 2 defines the read and check operation as the card is pulled out again. Phase 3 defines the search-scan operation during which the code word read from the card is compared with the code words recorded on the photographic film in unit 10, and phase 4 is the indicator phase subsequent to the search-scan operation. There may be additional delay and control phases, but this is merely a matter of circuit design, as the four phases mentioned define the principle operating steps of the system.

Phases 1 and 2 are established by and through a card positioning circuit 30; phase 3 may be established at the end of phase 2 but will be skipped in case of card read error; phase 4 is established at the end of phase 3, i.e., subsequent to scanning all of the data recorded on the film. The system is turned off to establish what could be called a fifth phase, or idle phase, through a manual switch 18 operated by the operator after he has, in fact, observed the indicator lamps. Alternatively switch 18 may turn the entire system off.

As the card 1 is inserted in slot 11 for the first time, a first switch, such as a limit switch 31, is actuated. Assuming that the system has not a standby power-on, idle phase, switch 31 could serve as a general turning-on switch of the system i.e., it is not necessary that the unit is connected to receive power at all times nor is a separate, manually operated on-switch required, though both cases are possible alternatives. The switch 31 is thus presumed to energize the entire circuit at the time of insertion of a card. In addition, this switch 31 serves as one of several card position sensing switches. Switch 31, when closing, causes card position circuit 30 to provide a signal to phase counter 17 and the system thus shifts into phase 1. The phase counter 17 now provides an enabling signal $\Phi_1$ to all circuits to be activated during phase 1.

Along one of the sidewalls of unit 10 forming slot 11 there are provided five contact fingers 20. As a card 1 is inserted in the slot of unit 10, it has thereby a position in which the five tracks of the code on the card are aligned respectively with the five contact fingers 20. These contact fingers are resiliently urged against the card and deflected only when a boss passes. The five contact fingers 20 are input sensors for a reader 21 which translates the deflection of the contact fingers into electrical pulses; one pulse for each deflection, no pulse as long as a contact finger remains undeflected. These electrical pulses appear in a five-output line channel 22 of reader 21 and in sequence of production.

In view of the particular format employed there is always at least one "1" bit for each character, and an OR gate 23 has its five input terminals connected to these five lines of output channel 22 to receive therefrom at least one pulse for each character. OR gate 23 defines a so-called "OR'd" clock, and its single output line 24, therefore, defines the character rate of the reading process.

If the "two out of five" encoding format is used, each character should have only two "1" bits, no more, no less. Therefore, a testing unit 25 has five input lines connected to the five-line output channel 22 of reader 21 in order to determine the correct format of each character. If the five channels are respectively denoted as A, B, C, D, and E, then this unit 25 may, for example, include an AND-OR configuration, responding, for example, to ABC+ABD+...+CDE. In either one of these cases separated by a logical + when true, a card code error is present and a true signal will be developed by AND-OR circuit configuration 25. That signal is used to trigger (set) a card code flip-flop 26 which controls the card code error indicator lamp 12. The same signal is also passed through an OR gate 27 to a read error flip-flop 28, for example, to set the flip-flop. The output of the flip-flop 28 controls the phase counter 17 in that as flip-flop 28 is set, phase counter 17 shifts immediately to indicator phase 4. The system stays in phase 4 and particularly lamp 12 remains on until the system is manually turned off (switch 18).

A counter 35 is provided and constructed as a shift register or as a binary counter receiving clock pulses from clock 23 through OR gate 29, for counting. A counter connect logic or counter mode control 33 determines whether or not counter 35 operates as a forward counter or as a reverse counter. This does not require elaboration as it involves primarily enabling of specific gates interconnecting the several stages of the counter 35 with regard to response to the clock pulses from OR gate 29. The signal $\Phi_1$, when true, is applied to mode control 33 via an OR gate and serves as an enabling signal, causing the counter to operate in forward direction and setting the counter to count state zero.

As the card 1 is being inserted initially and pushed through the slot, the reader 21 produces character signals at a sequence rate which is determined by the spacing of the characters on the card and by the speed of moving the card in slot 11; either process can be quite irregular. The OR'd clock 23 produces a clock pulse for each character and passes same through OR gate 29 to the counter. The insertion of the card itself caused the counter to become enabled by phase signal $\Phi_1$ to count in forward direction. Therefore, the counter 35 counts characters, in forward direction and as they appear in the reader.

Counter 35 has an output channel 36 which, for example, may include 10 or more output lines, each one representing a count number. Thus, circuit 35, when not a shifting counter, is presumed to include a decoder so that at any time only one line of channel 36 has a true signal; which one depends on the state of counter 35.

The output lines 36 are connected to a memory 40 which is basically a random access memory having a plurality of individually addressable storage locations to the character level. Each such character storage location has storage space for the 5 bits defining a character; there being at least as many locations in memory 40 as a card 1 has characters. Each such character location is individually addressed via one addressing line of channel 36.

The phase of the system determines whether the addressed location is about to receive or has to provide a data character. During phase 1 characters are stored in memory. The several storage locations of memory 40 are all connected to the output lines 22 of the reader serving as bus; 1 bit cell per character location, respectively is thus connected to one of the five lines 22. These connections are enabled by phase signal $\Phi_1$. Which one of the specific character locations in memory receives the data from the output channel 22 or bus depends upon the addressing signals as provided by counter 35 at any instant.

It will be appreciated, therefore, that as the characters of a card are sequentially read therefrom by reader 21, they are stored in the cells of memory 40, in like sequence. Each character causes the addressing counter 35 to advance so that sequential characters as callable from line 22 are stored in different locations. As the card has been completely inserted, the code word read from the card is completely in memory 40. Also, switch 31 opens and phase 1 is terminated.

In order to guard against the possibility that an unauthorized user has completely mutilated one character by completely flattening the two bosses thereof, a count-number detector (not shown) may be connected to counter 35. There should always be a particular number of characters per code word, but the attending dealer cannot be expected to count the characters. If the number of characters is not present, a trigger signal can be provided to read-error flip-flop 28 for shifting the system to phase 4 directly. Such mutilation may have been made in order to escape detection, as a code with one character less cannot possibly compare with the full, presumably "wanted" code. Indication of a read error may invite close inspection of the card and/or outright rejection by the dealer.

Alternatively, the code formal checking unit 25 may include longitudinal parity check, so that the codes are required to have one, two or possibly three longitudinal parity characters. Elimination of a character from a card through mutilation thus destroys longitudinal parity.

The card position logic 30 includes a second switch 37 as another input element. Switch 37 is positioned to be closed by the inserted card subsequently to switch 31. As the card is fully inserted, switch 31 opens but switch 37 remains closed, which state of switches causes the phase counter 17 to shift to phase 2, in the absence of a read error. The circuit will be such that closing of switch 37, subsequent to closing of switch 31 is suppressed in position circuit 30. Opening of switch 31, while switch 37 remains closed, provides the input of phase counter 17 for the changeover from phase 1 to phase 2.

As the user reverses the motion of card 1 to pull the card out of the slot 11 again, the reclosing of switch 31 remains ineffective. The counter mode control 33 is constructed to cause counter 35 to operate as reverse counter as soon as signal $\Phi_1$ turns false (another true signal is presently not provided by gate 34 to circuit 33). In addition, as the system has left phase 1, the connection of lines 22 to memory 40 is disabled. Instead, the phase signal $\Phi_2$ causes output signals as provided by lines 22 to be applied to one side of a comparator 41. These output signals will be developed during the retraction of card 1, when the contact fingers 20 of reader 21 again read the code on the card, but, of course, in the reverse order as compared with reading during phase 1.

The OR'd clock 23, likewise, is operated so that a clock pulse is produced with each character as read from the card. The clock pulse passes through OR gate 29, and as counter 35 is connected to count in the reverse mode, the count number held in counter 35 at the end of phase 1 is decreased. During phase 2, a five-line output channel or bus 42 of memory 40 is effectively connected to a second set of five inputs of the comparator 41 by operation of phase signal $\Phi_2$. Output channel 42 connects to all locations of memory 40, and the five lines constituting this output channel connect to 1 bit cell per word location.

During addressing provided again by counter 35, the contents of the several memory locations are applied sequentially to the lines 42 in the reverse order of the read-in process. The comparator 41 has five comparing stages and, therefore, provides a bit for bit comparison (in parallel) as between the 5 bits of each character read from memory and the 5 bits of each character concurrently read from the card. This is repeated for all characters of the code word. One can think of each of the comparator stages as an exclusive OR gate. The output of such a gate is true only if the 2 bits as applied are unequal, and the output remains false if they are equal. The outputs of all five comparator stages in comparator 41 are fed through a five-input OR gate (or are interconnected in an AND-OR configuration) to feed a single output line 43 of the comparator.

It is apparent, of course, that there should be identity as between each bit pair so compared. If any 2 bits of a pair do not compare, a true output signal is produced in line 43 serving as a second alternative input for the OR gate 27 and causing the read-error flip-flop 28 to be triggered. Should this occur, the system shifts again into phase 4 and the operation be terminated without checking the code against the film record. This is an important feature, as the double reading coupled with a bit for bit comparison checks on the correctness of the card reading process. Damage to bosses on the card can cause uncertainty in the reading process in that, for example, such a damaged boss deflects a contact finger (or a pair of contact fingers) only in one but not in the opposite direction.

After the card 1 has been removed from the slot, both switches 31 and 37 open. Position circuit 30 may include a NOR circuit feeding a true signal to an output line 38, only when the two switches are both open. This signal is applied to a "count zero" detector 44. Detector 44 connects particularly to the output line of channels 36 associated with and providing a true signal when counter 35 is in count state "zero." For gating, the detector 44 receives also the phase 2 signal $\Phi_2$.

At the end of the reverse-read operation and after removal of the card, the detector should be in count state "zero." The count "zero" detector 44 is constructed to provide a true signal into its output line 45 when for a true signal in line 38 (card out of slot) and during presence of a $\Phi_2$ signal, counter 35 is not in count state "zero," or when for a false signal in line 38 (card still in slot) and during presence of a $\Phi_2$ signal, counter 35 already reaches count state "zero" AND-gated "exclusive OR" configuration of circuit 44).

The true signal in line 45 serves as a third alternative input for the OR gate 27 to trigger the read-error flip-flop 28. A read error is thus signaled if the return of the counter to count state "zero" does not coincide with reading of the last character and the removal of the card. The number of characters read during forward reading (phase 1) thus differs from the number of characters read during the reverse reading mode (phase 2). Normally, in such a situation the comparator 41 can be expected to have responded already for signaling a read error, but an accidental balancing of errors may have prevented a response. For example, the first boss of the card may be damaged so that the first read-in process yielded one character less than the second read-in process. This error would be detected otherwise only when the total number of characters of the code has been checked.

Should any of the read errors occur, the no-read-error-lamp 13 fails to light up. If lamp 12 lights up instead, the read error is specified as a code error. The user may now, for example, inspect the card, clean it, if necessary, as foreign matter may have simulated a boss, and he may reinsert the card, to repeat the double reading process. As the card is reinserted, the system shifts again into phase 1 as described and due to closing of switch 31 ahead of switch 37.

If count zero is detected by circuit 44 during the first or a repeated attempt to read the card correctly, and concurrently with removal of the card, an output signal is produced by detector 44 into a second output line 46, which is connected to phase counter 17. The true signal in line 44 shifts the system to phase 3. The input of phase counter 17 requires as additional gating, that error flip-flop 28 is in the reset state (lamp 13 off) to permit this change. Phase signal $\Phi_3$, first of all, controls lamp 13 to light up as an indication that a read error did not occur. It will be recalled that in case of any read error the system shifts directly to phase 4. Additionally phase signal $\Phi_3$ initiates and controls the following operations to be described next.

A film, such as a photographic film 50, holds a record or the identifying code words of all credit cards regarded as invalid or "wanted." The film thus has five data tracks and transparent and opaque markers represent one and zero bits of the several characters defining the wanted card codes. For example, in this record are included the codes of cards which have been stolen, or where the users have exceeded the credit limit, where payment is overdue, or for cards which have been revoked but not returned by the user for any reason, etc. In addition to the photographic recording of the identifying code words of all the various "wanted" credit cards of film 50, beginning and end of the entire set of recordings are flanked by a character not representing any of the characters used for encoding card identifying codes. That may actually be a nonlegal character, as far as such encoding is concerned. (More than two 1-bits, odd parity, etc.) This control character defines end and beginning of recorded data on the film. The reason for providing this control character is to avoid actual reading of photographic data from outside of space as defined along the length of the film by these two characters. This restriction of character evaluation improves noise rejection capabilities of the system. The characters must be similar, as recording can commence from either end. This control character can be defined as a "start-stop" code.

Any two groups of characters on the film defining two different identifying code words and being located in immediate sequence on the film are separated from each other by another character, also possibly a nonlegal character as to card encoding and which can be called a group code. Thus, the group code marks the end of one and the beginning of the next character group (unless the start-stop code follows) defining "wanted" code words.

The film is wound on one of the two reels 51 and 52 respectively. A reel position sensing circuit 53 determines whether the film is wound on reel 51 or on reel 52. The output line 54 of position sensor 53 is enabled by signal $\Phi_3$ only during phase three and will include a flip-flop which is set, for example, if the film is wound on reel 52 so that a true signal in its output line 54 is provided in that situation and that situation only. If the film is wound on reel 51, the line 54 provides a false signal in phase 3 (as in all other phases).

The reels 51 and 52 are coupled to a reversible motor 55 which is under control of a motor control circuit 56 of general design. The output signal in line 54 from the "initial reel position sending" flip-flop of circuit 53 will be fed to the motor control circuit as it determines the direction of the rotation of the motor 55, and as controlled from the circuit 56. Alternatively, a unidirectional motor 55 could be coupled to the reels through a reversible clutch which is under control of the signal in line 54. In either case, control circuit 56 receives the phase signal $\Phi_3$ to start motor 55. The phase signal $\Phi_3$ also causes a lamp 61 (or a set of lamps) to be turned on.

As motor 55 begins to run, the film is unwound from the reel on which it is wound and is rewound on the respective other reel. As the film is reeled, it passes through the photoelectric detection station 60 of which lamp 61 is a part. A lens or lens system or systems, for example, 62, focuses a light bar or five light spots on the five data tracks on the film, and an optical system 63 projects the light as modulated by the opaque and translucent data markers on the film onto five photocells of a photoelectric detector system 65.

The detector circuit includes amplifiers for each photocell to provide signals at a more suitable level. The photocells generate electrical signals in accordance with the modulated light, the modulation representing, of course, the photographic information as recorded in the five data tracks on film 50. The five photocells feed their outputs into a five-line channel 66. The output signals of channel 66 are first fed to a start-stop code detector 67. Other circuits connected to the five lines of channel 66 are disabled until the detector 67 has detected the start-stop code.

As start-stop code detector 67 responds, it triggers, for example, a toggle flip-flop 68. That flip-flop, when set, enables several circuit elements, to be described in the following paragraphs. Towards the end of the film and at the end of the recordings thereon, the start-stop code is detected again by detector 67 and toggle flip-flop 68 is turned off to disable the circuit elements which are enabled when flip-flop 68 is set. This limits the operation of various processing circuits to the period in between the detection of the two start-stop codes flanking the recorded data on the film.

During the search-scan operation, characters are sequentially read from the film 50, and they are to be compared with the characters held in memory 40. As memory 40 holds data in a manner which does not erase them when they are read out, memory 40 still holds the characters read from the card initially. The memory 40 must be addressed in such a manner that the sequence of character withdrawal is, in fact, comparable with the character presentation by the film when passing through station 60 in particular direction. Thus, should the identifying code word read from the card 1 be one which is listed on the film, then a comparison on a serial by character, parallel by bit basis is possible only if the characters are read from the memory in such a sequence that, depending on the direction of the motion of the film, the characters are read therefrom in like sequence.

The output signal in line 54 of tape position sensor 53 serves as an alternative input for the OR gate 34, causing counter mode counter 33 to operate the counter 35 in the forward mode if the film is on reel 52. A false signal in line 54 signals to control 33 that the film will move in the reverse, and correspondingly counter 35 has to operate in the reverse.

The mode control of counter 33 as it is under control of initial film position sensor 53 thus places the counter into the correct operational state. The channel 66 feeds into an OR'd clock circuit 69, being enabled only when control flip-flop 68 is in the set state, and providing alternative clocking signals through OR gate 29 to counter 35. Thus, the rate of character comparison and memory addressing is under control of the film.

The five data lines of channel 66 feed into one side of a five-stage comparator 70. The other side of the comparator connects to the five output lines 42 of memory 40, the particular connection being enabled by the $\Phi_3$ signal. Comparator 70 is constructed similar to comparator 41 to provide bit for bit comparison (in parallel) for the 5 bits each of the two characters to be compared, one being read from the film and one being copied from memory, accordingly. The single output channel 71 receives a true output whenever 2 bits as compared have unequal values. Such a signal is fed through an OR gate 73 to a detector flip-flop 72 as a set signal.

In order to make sure that the comparison is strictly on a word for word basis, there is provided a group code detector 75 being connected to the five lines of the detector output channel 66 to respond to each group code. When detecting the group code, an output signal is provided by detector 75 to its output line 76, causing flip-flop 72 to reset. Therefore, any character read from film 50 in between two group codes when not comparing with the character read concurrently from memory 40, causes line 71 to turn true and to set flip-flop 72. As the group code is detected, flip-flop 72 is turned off and is thus prepared for the comparison of the next code word on the film with the code word in memory 40.

If the two code words thus compared differ, at least one character in each must differ from the concurrently presented respective other one, causing flip-flop 72 to be set. On the other hand, if flip-flop 72 is in the reset state by the time detector 75 has detected the group code, then the particular, multicharacter code word just read from the film compares character for character-bit for bit with the code word defined by the characters held in memory 40. Thus, if flip-flop 72 is still reset at the time the group code is detected, the card is on the "wanted" list.

There is provided an AND gate 77 having one input connected to the reset output side of flip-flop 72 and responding additionally to the output of group code detector 75. Gate 77 thus provides a true output only if the record 50 holds the same identifying code as recorded on and read previously from the card 1. The output of gate 77 triggers a flip-flop 78, the set side output of which connects to and controls the "red" lamp 14.

In the search-scan operation as described, the output signal of group code detector 75 is also used to reset counter 35. The resetting, of course, depends on the direction of counting. The counter will be reset to zero for forward counting operation, and the counter will be set to a number equal to the highest number of characters of a word plus one, in case of reverse counting, unless the counter is a recycling counter, having a cycle number equal to the number of characters per word to count backwards, also from count state zero.

The group code character is, of course, also a character which triggers the OR clock 69 so that for each memory read cycle the counter is for one character clock period in a count state which is associated with an empty or a nonexisting memory cell. As the concurrently read code (viz., the group code) does not compare with the all zero bit character in the empty (or not existing) location, the output of comparator 70 will turn true. However, this output should be suppressed so that the group code detector 75 (line 76) provides an inhibiting signal to gate 73. Alternatively, one could provide this particular memory location as a read-only location holding the group code so that its content, when readout in the comparing cycle, leads to a compare-situation, holding line 71 to the false state.

In order to avoid that a read error of the film produces a faulty indication (simulation of presence of the card code on the wanted list), a parity detector 81 is connected to the five lines of channel 66. Frequent use may cause film 50 to deteriorate. The parity detector, therefore, checks on the correctness of the record 50 each time a character is read therefrom. Checking of parity can be implemented simpler than checking "two out of five" and suffices for the present purpose.

Upon detection of a parity error, circuit 81 sets a flip-flop 83 and the parity error lamp 16 goes on. In addition, it is advisable to treat the parity error detector output in line 82 as an alternative to OR gate 73. This way it is avoided that as a result of a parity error, a particular character (and, therefore, possibly a number) is recognized as identical with the character concurrently read from memory. Even though rather improbable, it is conceivable that the two words compared differ only because the two characters differ in one of which occurs the parity error, likewise simulating a noncompare situation and thus simulating a noncompare situation of the code words as a whole. Again, it is this, a situation which must be avoided so as to avoid unwarranted accusations. Treating the parity error signal as a noncompare signal equivalent in the input circuit for flip-flop 72 eliminates the possibility of such an error. It may, of course, be that the number on the film in which a parity error was detected is, in fact, the same as that on the card. In this case the card is signaled as being not on the "wanted" list, even though it is, but the probability that that occurs is extremely low. The main purpose of this error checking thus is to avoid with certainty that the unit signals "red card on wanted list" when, in fact, it is not so.

Towards the end of the film record the start-stop code is detected again, and detector 67 causes toggle flip-flop 68 to be reset as described. An AND gate 79 responds to the reset state of flip-flop 68 at phase 3 and provides a true output in in case flip-flop 78 is in the reset state at that time. Flip-flop 78 is in the reset state at that time when the card is not on the wanted list. If that is true, gate 79 sets a flip-flop 80, which, in turn, controls the "green" lamp 15. Signal $\Phi_4$ should be used for additional gating. If lamp 14 has been turned on during the search-scan operation, the set state of control flip-flop 78 prevents triggering of flip-flop 80.

The toggle flip-flop 68, when reset, will also cause the phase counter 17 to advance to phase 4. Phase signal $\Phi_4$ causes the motor 55 to stop. During phase 4 the lamp 15 is either on or not; if not, lamp 14 is on, provided the search-scan phase 3 took place. Phase 4 is preferably terminated manually (switch 18), as stated, to make sure that the dealer has, in fact, become aware of the search-scan result, according to which either the red lamp 14 or the green lamp 15 will be on. Also, it will be recalled that the system shifts directly into phase 4 after a read error has been detected, whereby read-error is indicated by the failure of lamp 13 to light up after the card has been withdrawn. If lamp 12 lights up concurrently, the read error is specified as a code error. Manual termination of phase 4 ensures also in this case that the user has become aware of the visible indication provided by the system. The flip-flop 78, 80 and 83, if set, are reset at the falling edge of phase signal $\Phi_4$.

When red lamp 14 goes on, the search may not yet be completed in the sense that the entire content of the film has not yet been checked. However, the search has been completed as far as a particular card and the desired result are concerned. Thus, in order to make sure that the film is reeled completely through the station, switch 18 can turn the system off only when the system is in phase 4. If the user of the system presses switch 18 prematurely, nothing will happen.

It will be appreciated from the foregoing description that the system is not restricted in principle to operate with a fixed number of characters per identifying code word, unless a check on that number is provided for. The number of characters per identifying code word may be the same for many cases, but an increase in that number does not change operation of the system, as long as the capacity of the memory and the range of the address counter are not exceeded. Should, for reasons of contemplated system expansion, a check on the number of characters per word be impractical, one, possibly two or three longitudinal parity check characters could be included as was stated above. Of course, nothing precludes restriction of the system design and circuit to a fixed word format, but from a practical standpoint it is advisable to allow for format expansion without requiring circuit changes in the system.

Likewise, the number of characters per "wanted" card as recorded on the film does not have to be uniform. Codes having more or less characters than the one read from the card, automatically will lead to a noncompare situation (at least one true signal in line 71 in between two sequential group code detector responses). The situation could occur that a shorter "wanted" code on the film appears as a subcode in a card with a longer identifying code when read from one direction. If the apparatus is operated under such circumstances and possibilities, then a card, when having produced a red light indication, should be inserted again. Now the film is scanned in the reverse direction and the situation will not lead to a red light indication, unless the code has a peculiar, symmetric format and should be avoided upon issuing codes.

The invention is not limited to the embodiments described above, but all changes and modifications thereof not constituting departures from the spirit and scope of the invention are intended to be covered by the following claims.

I claim:

1. An apparatus for testing credit cards for use in association with retailing facilities or the like, each card having a particular code defined by a plurality of serially placed characters, each character defined by manifestations of a plurality of bivalued bits of information, stored on the card in machine readable form, there being plural tracks on the card accordingly, comprising:

a card reader for reading the code on the card in serial by character, parallel by bit operation when pushed through the reader in either direction colinear with the direction of data tracks on the card, card reader including reading means, providing signals representative of the characters, the signals having bivalued format in representation of the bits;

memory means connected to the card reader to receive the signals and storing them in individually, addressable storage locations, when the card is pushed through the reader in one direction;

memory addressing counter means operated by an in synchronism with the passage of characters on a card past the reading means to access sequentially the individually addressable storage locations in the memory means;

first means connected to the reader and to the memory means for comparing the signals as stored with the signals provided by the reader when reading the code subsequently in the reverse while the card is pulled from the reader in the opposite direction whereby the memory addressing means calls on the storage locations in inverse sequence for readout of the stored signals;

second means connected to the first means to provide an indication representative of absence or presence of comparison; an exchangeable movable data storage strip storing a plurality of codes as serial characters, each character in parallel by bit format, there being as many data tracks as each character has bits, adjacent multicharacter codes being separated by a particular character, the data storage strip being disposed in physical association with the reader as part of the testing apparatus;

third means coupled to the storage strip for reading the characters stored on the carrier when moved past the means for reading by operation of the reading means and providing signals representative thereof;

fourth means coupled to the movable strip for reeling the strip past the third means for obtaining reading of the characters on the carrier;

fifth means connected for deriving from the storage strip a sequence of clock pulses as the strip moves past the third means for reading;

sixth means connected for receiving the clock pulses and operating the addressing counter means for sequentially and cyclically addressing the memory means for sequentially reading the signals stored therein, on a repetitive basis;

seventh means connected to the memory means to receive the signals representing characters as sequentially read from the memory means and being further connected to the third means to be responsive to the signals provided by the third means and representing characters as sequentially read from the carrier, to serially compare the signals on a character for character basis and on a parallel by bit basis per respective two characters to be compared, the third through sixth means operating in dependence upon indication provided by the second means in representation of presence of the comparison as provided by the second means, and including eighth means for operation on a cyclic basis, to provide an indication whether all characters read from the memory compare with a like number of characters read concurrently from the carrier;

ninth means connected to the third and to the eighth means to be responsive to the particular character for controlling the cyclic repetition of the sixth means; and means connected to provide an indication whether any of the codes on the strip compares with the code read from a card.

2. Apparatus as in claim 1, the exchangeable data strip being a photographic film, the third means including illuminating means and a plurality of photoelectric means equal in number to the plurality of data tracks for reading the characters as stored on the film and providing the signals representative thereof.

3. Apparatus as set forth in claim 1 and including means connected to the card reader for checking on the format of the signals to obtain an indication whether or not the code as represented by the signals has a particular format.

4. Apparatus as set forth in claim 1, the memory means including a memory proper and a bidirectional addressing counter, connected to be operated in synchronism with the reading of each character from the storage carrier, the apparatus including means sensitive to the direction of the storage carrier for controlling the direction of counting.

5. Apparatus as set forth in claim 1, there being at least one second particular character on the record carrier at beginning and end of the recording on the carrier; and means connected to the first means for being responsive to the second particular character for controlling enabling and disabling of the fifth means.

6. An apparatus for testing credit cards or other identification cards, each having a particular identifying code recorded thereon in machine readable form and in serial by character, parallel by bit format, the bits arranged in plural data tracks, comprising:

first means for receiving a card for forward and backward motion in direction colinear with the data tracks on the card;

second means coupled to the card when in the first means for reading the code therefrom in forward and again in reverse direction in relation to placement of the card in the first means, and providing signals representative thereof;

third means connected to the second means for storing the signals when the code on the card is read in the forward direction;

fourth means connected to the second and third means to compare the signals provided by the second means during reverse card reading with the signals stored in the third means, and providing an indication representative of absence or presence of comparison of the respective signals;

fifth means including a data storage strip storing signals representative of a plurality of codes and also in serial by character, parallel by bit format;

sixth means coupled to the storage strip for reading the stored signals and presenting them in said format; and seventh means connected to the second and sixth means for comparing the stored signals with the signals received from the storage carrier and providing an indication of absence or presence of the code read from the card when in the first means among the codes on the storage carrier.

7. An apparatus as set forth in claim 6 including means connected to operate the fifth and sixth means in response to presence of comparison signal of the fourth means.

8. In a card testing device for testing cards on which are recorded identifying codes in machine readable form, the codes comprising a plurality of serially arranged characters, each having a plurality of bits in parallel, comprising:

a card reader constructed for reading the characters when the card passes the reader in one of the two opposite directions corresponding to the serial arrangement of characters of the card, the reader providing a plurality of bivalued signals when reading each of the characters on the card;

a memory connected to the card reader and having a plurality of individually addressable storage locations to the character level;

an addressing counter connected to the memory for operating the memory addressing;

means connected to the card reader for receiving therefrom clock signals representative of the passage of characters on the card when read by the reader, and feeding the clock signals to the addressing counter for operating same;

means positioned to be responsive to the direction of card movement and connected to the counter for controlling the direction of counting of clock pulses thereof, further connected to operate the memory for read-in and readout in dependence upon the direction of card movement, and including control means connected to cause the storage of the character representing signals provided by the reader when reading from the card as the card moves in a first direction, in sequential storage locations of the memory; and a comparator connected to the reader and to the memory to compare the content of the storage locations as sequentially addressed with the signals, provided by the reader when subsequently reading the card as moving in the opposite direction.